June 15, 1948.　　　　E. F. SARVER　　　　2,443,328
TRACTION WHEEL

Filed Feb. 25, 1943　　　　　　　　　　2 Sheets-Sheet 1

INVENTOR:
Emmett F. Sarver.
BY
ATTORNEYS.

June 15, 1948.  E. F. SARVER  2,443,328
TRACTION WHEEL
Filed Feb. 25, 1943  2 Sheets-Sheet 2
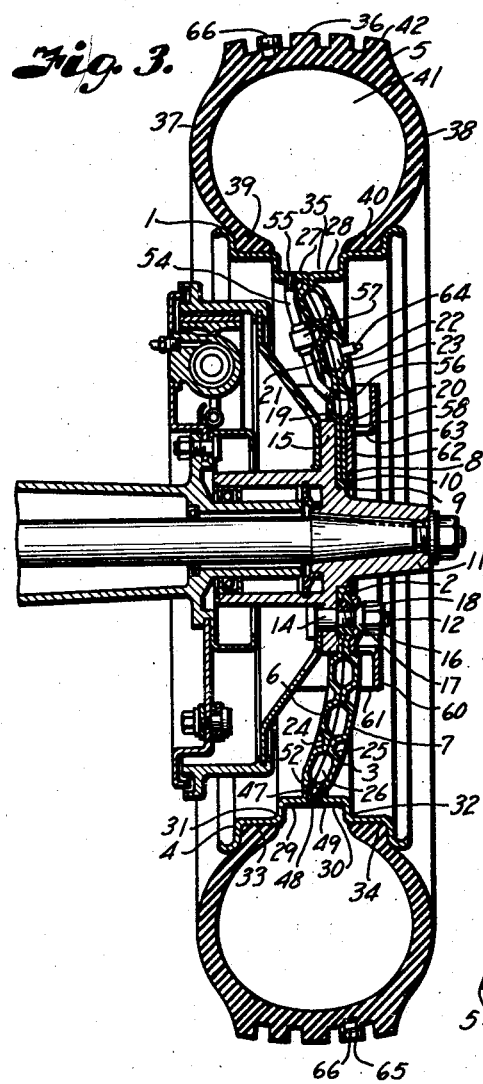
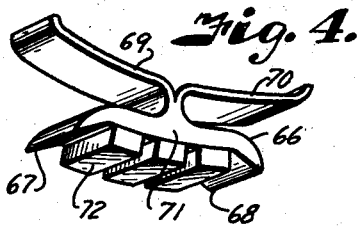
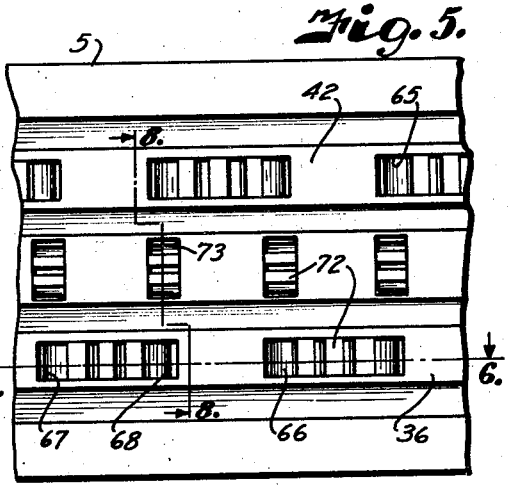
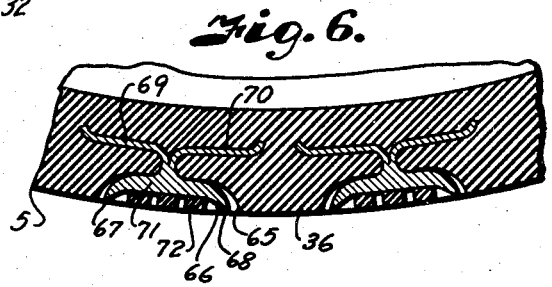
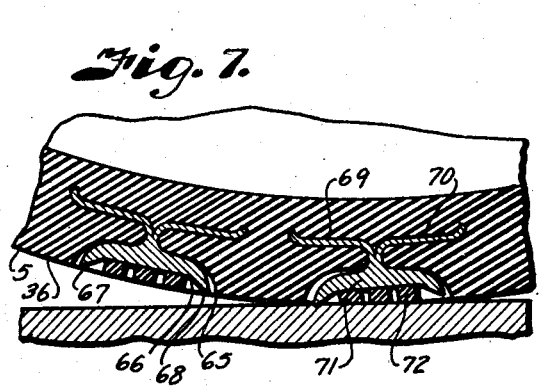
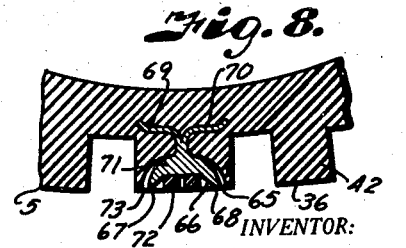
INVENTOR:
Emmett F. Sarver.
BY Arthur C. Brown.
ATTORNEYS.

Patented June 15, 1948

2,443,328

UNITED STATES PATENT OFFICE 2,443,328

TRACTION WHEEL

Emmett F. Sarver, Wichita, Kans., assignor of one-half to O. W. Wortman, Wichita, Kans.

Application February 25, 1943, Serial No. 477,023

8 Claims. (Cl. 152—418)

This invention relates to traction wheels, particularly for motor vehicles, and has for its principal object to provide a wheel structure for promoting safe operation of a vehicle.

Another object of the invention is to provide a wheel with a resilient tread or tire inflated with a refrigerating medium which provides the necessary cushioning action and maintains the tread at a predetermined temperature and pressure thereby providing longer life and safer operation at high vehicular speeds.

Other objects of the invention are to provide for dissipating heat of traction absorbed by the inflating medium, and to provide a wheel having a plurality of gas cushion chambers so that leak through punctures and the like will not cause immediate deflation.

In accomplishing these and other objects of the invention, hereinafter pointed out, I have provided improved structure, the preferred form of which is illustrated in the accompanying drawings, wherein:

Fig. 3 is a vertical section through the wheel.

Fig. 4 is a perspective view of one of the antiskid elements.

Fig. 5 is a partial plan view of the wheel tread illustrating arrangement of the antiskid elements.

Fig. 6 is a section through a portion of the tread on the line 6—6 of Fig. 5, showing position of the antiskid elements when the wheel has ample traction with the road surface.

Fig. 7 is a similar view but showing one of the antiskid elements moved into gripping position to increase traction when the wheel loses traction with the road surface.

Fig. 8 is a cross-section on the line 8—8 of Fig. 5.

Figure 1:
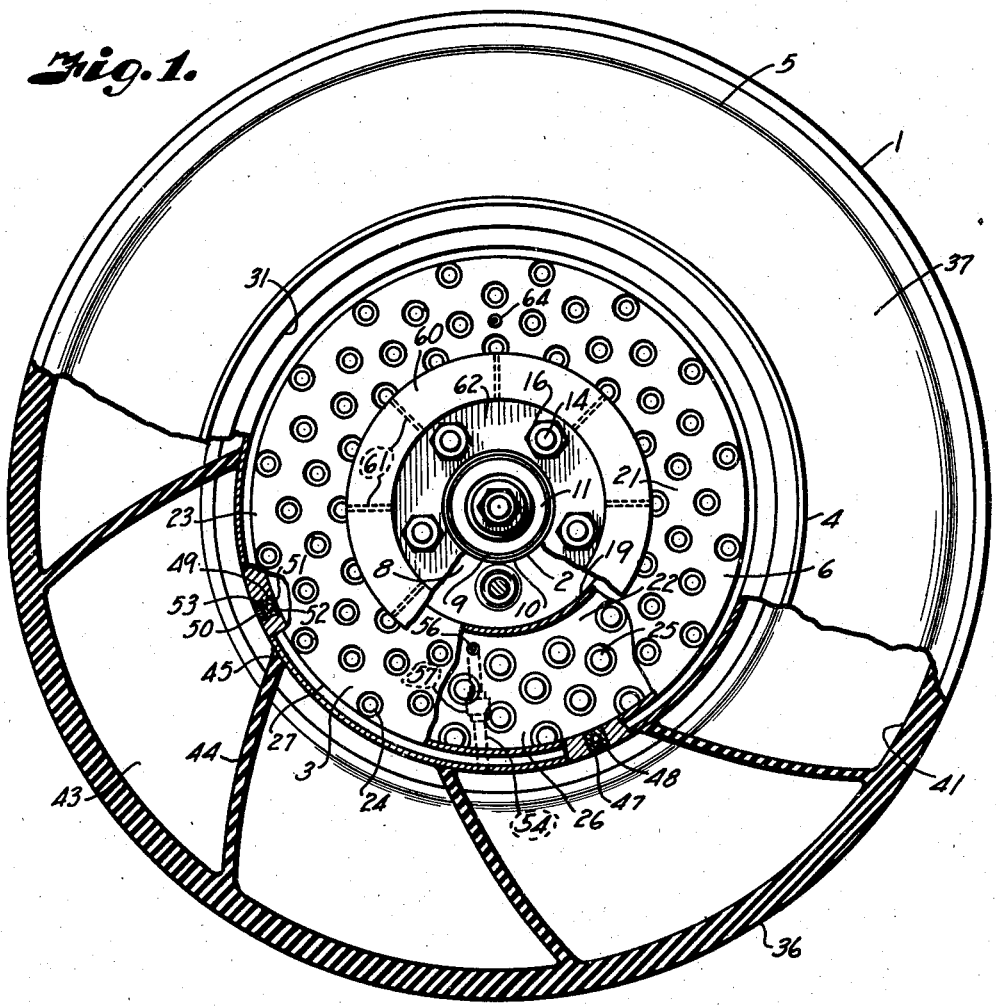
Fig. 1 is a side elevational view, partly in section, of a wheel embodying the features of the present invention.

Referring more in detail to the drawings:

1 designates a vehicle wheel constructed in accordance with the present invention and which includes a hub flange 2, a web 3, a rim 4 and a resilient tread or tire 5.

The portions 2, 3 and 4 are preferably formed of relatively thin heat conductive material and consist of a pair of facing disks 6 and 7 having inner annular portions 8 positioned in face to face contact and secured together by welding or the like to form the hub flange 2. The inner edges of the annular portions 8 are preferably flanged laterally, as at 9 and 10, to enhance rigidity and increase seating contact with a hub 11 of a motor vehicle axle. The flange portion thus formed is provided with the usual openings 12 to pass studs 14 by which the wheel is secured to the flange 15 of the hub 11, the flanges being retained by nuts 16 threaded on the outer ends of the studs and having conical portions 17 engaging conical seats 18 encircling the openings 12, as in usual automotive wheel mounting.

Figure 2:
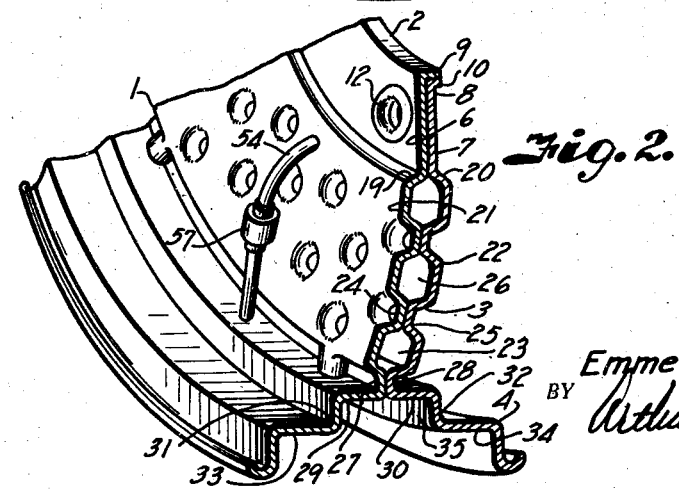
Fig. 2 is a perspective section of a portion of the wheel rim and web particularly illustrating the condenser formed in the web portion of the wheel.

The disk portions are offset outwardly circumferentially of the hub flange, as at 19 and 20, to provide spaced walls 21 and 22 of a condenser 23 for a purpose later described. The walls 21 and 22 are preferably spaced apart by providing the disks with a plurality of bosses 24 and 25 arranged so that the bosses on one disk abut against the bosses on the other disk, as best illustrated in Fig. 2, the bosses being secured together in any suitable manner, for example by spot welding, to provide an extremely rigid web portion for the wheel and assure alignment of the rim portion 4 relative to the hub mounting. The walls 21 and 22 cooperate in forming an annular passage or chamber 26 and the bosses 24 and 25 divide the chamber into a tortuous passageway to increase surface contact of the walls with an inflating medium passed through the chamber 26.

The disk members have offsets 27 and 28 circumferentially of the chamber 26, to close the periphery of the chamber and enhance rigidity of the wheel structure adjacent the rim 4. The disks have outward annular flanges 29 and 30 which form the rim portion of the wheel to mount the tire or tread 5. The flanges 29 and 30 have offsets 31 and 32 therein to provide annular seats 33 and 34 for the bead portions of the tire and form an intermediate drop center 35 to increase the effective size of the inflation chamber of the tire now to be described.

The tire 5 of the wheel is formed of a flexible, gas-tight material such as natural rubber or a suitable synthetic rubber, to provide a resilient tread or traction wall 36, side walls 37 and 38 and beads 39 and 40 so that it conforms in general shape to a standard automotive tire and cooperates with the drop portion of the rim to form an annular inflation chamber 41 therein. The traction wall of the tire is provided with the usual antiskid ribs 42 which may extend circumferentially of the tire or be of any desired shape to promote traction with a road surface and resist skidding on slippery road surfaces.

The chamber 41 is preferably divided into a plurality of sub-chambers 43 by transverse partitions 44 arranged angularly with respect to radii of the wheel so that upon collapse of the tire the partitions 44 will tend to assume a flattened position between the rim and tread of the wheel and avoid any buckling that may tend to tear the partitions loose from the outer walls of the tire.

The partitions are preferably formed integrally with the walls of the tire and have tongue portions 45 extending into the drop center portion of the wheel rim, these tongues being preferably sealed with the rim by any suitable cement applied when the tire is inserted on the rim.

It is to be understood that the tire thus described may be made demountable as a conventional tire or it may be vulcanized or cemented to the rim to form a unitary and permanent part of the wheel.

The rim portion of the wheel in registry with each sub-chamber is provided with an internally threaded opening 47 to mount a valve assembly 48 therein. The valve assembly includes an exteriorly threaded body 49 to receive the threads of the opening 47 and has a through bore 50 shaped to provide an intermediate valve seat 51 for a ball valve 52 that is yieldingly retained on the seat by a spring 53, the unit being inserted so that the ball seats in the direction of the condenser chamber. Each sub-chamber is also connected with the inner portion of the condenser chamber through ducts or tubes 54 having outer ends connected with ports 55 in the rim and inner ends connected with ports 56 opening through the side walls 21. The tubes or ducts are provided intermediate the ends thereof with a valve assembly 57 having a ball valve seating in the direction of the inflation chambers. The ball valve is normally retained on its seat by a spring similar to the valves previously described. The springs are such that they maintain a predetermined inflation pressure in the tire as later described.

In order to enhance the cooling action of air on the condenser the outer disk is preferably provided with a fan 58 comprising an outwardly spaced ring 60 having a plurality of inwardly extending blades 61 which are secured to the outer disk of the wheel by a plate 62 which preferably reinforces the hub flange portion of the wheel. When the wheel is rotated, air is drawn through the opening 63 formed by the ring 60 and discharged by the blades circumferentially thereof to move over the surface of the outer condenser wall to dissipate heat absorbed by the walls from the inflating medium moved through the condenser, as now to be described.

After the wheel has been constructed and assembled as above described, air may be removed from the inflation and condenser chambers and a few ounces of a liquid gas are allowed to flow through a service fitting 64 provided in the disk wall of the wheel. The gas may be any one of the well known refrigerating mediums which has a chemical composition not injurious to the materials forming the wheel. The gas or inflating mediums must also have a boiling point corresponding with the desired working temperature and pressure that are to be maintained within the inflation chambers of the wheel. For example, a gas having these characteristics is sulphur dioxide, however, it is desirable to mix a dry inert gas therewith such as dehydrated air in a mixture of 75% sulphur dioxide and 25% air. It will be understood that these proportions need to be altered to suit the various service requirements under which the wheel is to be used. The purpose of the air is to provide a sufficient pressure for supporting the vehicle without injury to the resilient portions of the tires when the temperatures are so low that there would not be enough gas to maintain the required pressures. Enough of the liquid gas is admitted so there will be a surplus of liquid in the inflation chamber 41 after the working pressure of the gas chambers has been established. When the wheel is stationary, the surplus liquid collects in the lower portions of the respective chambers but when the wheel rotates the surplus liquid will flow to and be distributed over the inner surface of the tread wall responsive to centrifugal action and form in a relatively thin ring about the periphery of the inside of the inflation chamber, thereby maintaining balance in the wheel and forming a refrigerating effect in that the heat of traction accumulating in the tire vaporizes the liquid and of course is absorbed by the vapors. The hot vapors resulting from the boiling liquid would normally tend to increase the inflation pressure, however, the valve springs of the valves 57 are so set that when the pressure tends to rise the valves unseat against action of the springs and allow flow of gas to the condenser chamber. Since the gas is lighter, it will move in opposition to centrifugal force generated by the liquid. When the gas reaches the condenser it will be cooled and reliquefied incidental to the cooling effect of air discharged by the fan. Upon liquefaction the inflation medium is discharged centrifugally through the valves into the inflation chambers to maintain a sufficient excess of liquid for establishing the desired working temperature of the tire and absorb heat of traction as well as any heat generated through internal working of the resilient material from which the tire is formed.

In order to enhance traction of the wheel, the periphery thereof is preferably provided with a plurality of recesses or pockets 65 for loosely containing anti-skid elements 66. These elements are preferably formed of metal and have prongs 67 and 68 at the ends thereof adapted to dig into the surface of the road upon tilting of the anti-skid devices within the recesses. The anti-skid devices are retained in position by spring anchors 69 and 70 embedded in the material from which the tire is formed. Intermediate the prongs 67 and 68 the anti-skid devices have relatively flat heads 71 which mount resilient buttons or knobs 72 that normally lie flush with the tread surface of the tire to contact the road surface, however, the pressure thereof against the road surface is that imparted by the spring action of the anchoring fingers 69 and 70. Therefore, when the wheel tends to lose traction there is sufficient relative movement between the elements 72 and tread surface to cause tilting movement of the anti-skid devices into the position shown in Fig. 7 to bring one or the other prongs into contact with the surface of the road depending upon direction of rotation of the wheel.

In order to prevent lateral skidding of the wheel, certain of the antiskid devices are preferably arranged transversely of the tread, as indicated at 73 in Figs. 5 and 8. The antiskid devices also have an important function of providing an audible signal whereby the metal parts thereof contact the roadway when the tire has worn and produce a clicking sound to warn the driver and highway patrolmen that the vehicle tires are worn and are a traffic menace.

From the foregoing it is obvious that I have provided a wheel of relatively strong, light weight construction. It is also obvious that the wheel is of longer life and provides greater safety than a conventional automotive wheel for the reason that the working temperatures of the wheel are maintained constantly uniform and below the temperatures causing failure of the materials from which the tread portion of the wheel is formed.

What I claim and desire to secure by Letters Patent is:

1. A wheel including a resilient tire having a chamber for an inflating medium, an inflating medium in said chamber having liquid and vapor phases at atmospheric temperature, said medium being in sufficient quantity to maintain a determinate inflation pressure at said temperature and the liquid portion of said medium being vaporizable under heat of traction on the tire when the tire is in use to absorb heat from the tire, and vapor condensing means associated with said wheel for dissipating heat absorbed by said vaporized medium and for reliquefying said medium.

2. A wheel including a resilient tire having a chamber for an inflating medium, an inflating medium in said chamber having liquid and vapor phases at atmospheric temperature, said medium being in sufficient quantity to maintain a determinate inflation pressure at said temperature and the liquid portion of said medium being vaporizable under heat of traction on the tire when the tire is in use to absorb heat from the tire, pressure release means connected with said chamber for discharging vapor in excess of that required to establish said inflation pressure, vapor condensing means associated with said wheel and connected with the pressure release means for dissipating the absorbed heat and for liquefying said discharged vapor, and duct means connecting said vapor condensing means with said chamber to return the liquid from the vapor condensing means to the chamber for maintaining liquid in said chamber.

3. A wheel including a hub, a rim, a condenser connecting the hub with the rim, a resilient tire supported on said rim and having a chamber for containing an inflating medium, an inflating medium in said chamber and having liquid and vapor phases at atmospheric temperature said inflating medium being in sufficient quantity for maintaining a determinate inflation pressure in said tire, said inflating medium in the liquid phase being vaporizable by the heat of traction generated in said tire, pressure release means connecting the tire chamber with the condenser for discharging vapor from the tire chamber in excess of that required to maintain said determinate pressure, duct means connecting the condenser with said chamber for returning the liquid from said condenser to the chamber by centrifugal force, and a check valve in said duct means.

4. A wheel including a hub, a rim, a condenser connecting the hub with the rim, a resilient tire supported on said rim and having a chamber for containing an inflating medium, an inflating medium in said chamber and having liquid and vapor phases at atmospheric temperature, said inflating medium being in sufficient quantity for maintaining a determinate inflation pressure in said tire, said inflating medium in the liquid phase being vaporizable by the heat of traction generated in said tire, pressure release means connecting the tire chamber with the condenser for discharging vapor from the tire chamber in excess of that required to maintain said predetermined pressure, duct means connecting the condenser with said chamber for returning the liquid from said condenser to the chamber by centrifugal force, a check valve in said duct means, and a fan carried by the wheel and discharging onto the condenser for dissipating the heat in the condenser.

5. A wheel including spaced disk portions forming a condenser chamber therebetween, a rim carried by the disk portions, a resilient tire supported on the rim and having a chamber for containing an inflating medium, an inflating medium in said chamber having liquid and vapor phases at atmospheric temperature, said inflating medium being in sufficient quantity to maintain a determinate inflation pressure at said temperature and the liquid portion of said medium being vaporizable under heat of traction on the tire when the tire is in use to absorb heat from the tire, pressure release means connecting the tire chamber with the condenser chamber for discharging vapor into the condenser chamber in excess of that required to maintain said inflating pressure, and a duct connecting the chambers for conducting the inflation medium in said liquid phase from the condenser chamber to the tire chamber by centrifugal force generated responsive to wheel rotation for vaporization in said tire chamber.

6. A wheel including spaced disk portions forming a condenser chamber therebetween, a rim carried by the disk portions, a resilient tire supported on the rim and having a chamber for containing an inflating medium, an inflating medium in said chamber having liquid and vapor phases at atmospheric temperature, said inflating medium being in sufficient quantity to maintain a determinate inflation pressure at said temperature and the liquid portion of said medium being vaporizable under heat of traction on the tire when the tire is in use to absorb heat from the tire, pressure release means connecting the tire chamber with the condenser chamber for discharging vapor into the condenser chamber in excess of that required to maintain said inflation pressure, a duct connecting the chambers for conducting the inflating medium in said liquid phase from the condenser chamber to the tire chamber by centrifugal force generated responsive to wheel rotation for vaporization in said tire chamber, and a fan carried by said wheel and arranged to discharge air in cooling contact with at least one of said disk portions.

7. A wheel including a resilient tire having a chamber for an inflating medium, an inflating medium in said chamber having liquid and inflating medium phases at atmospheric temperature, said vapor being in sufficient quantity to maintain a determinate inflation pressure at said temperature and the liquid portion of said medium being vaporizable under heat of traction on the tire when the tire is in use to absorb heat from the tire, vapor condensing means associated with said wheel for dissipating heat absorbed by said medium and for reliquefying said vaporized medium, and a second inflating medium in said chamber to maintain partial inflation at extremely low atmospheric temperatures.

8. A wheel including a hub, a rim, a condenser connecting the hub with the rim, a resilient tire supported on said rim and having a chamber for containing an inflating medium, an inflating medium in said chamber and having liquid and vapor phases at atmospheric temperature said inflating medium being in sufficient quantity for maintaining a determinate inflation pressure in said tire, said inflating medium in the liquid phase being vaporizable by the heat of traction generated in said tire, pressure release means connecting the tire chamber with the condenser for discharging vapor from the tire chamber in excess of that required to maintain said predetermined pressure, duct means connecting the condenser with said chamber for returning the liquid from said condenser to the chamber by centrifugal force, a check valve in said duct means, and a second inflating medium in said chamber to maintain partial inflation at extremely low atmospheric temperatures.

EMMETT F. SARVER.

REFERENCES CITED

The following references are of record in the file of this patent:

UNITED STATES PATENTS

| Number | Name | Date |
|---|---|---|
| 953,299 | Schneider | Mar. 29, 1910 |
| 1,247,681 | Howard | Nov. 27, 1917 |
| 1,253,856 | Marquette | Jan. 15, 1918 |
| 1,436,594 | McClure | Nov. 21, 1922 |
| 1,780,306 | Manly | Nov. 4, 1930 |
| 1,956,739 | Gollert | May 1, 1934 |
| 2,299,796 | Chase | Oct. 27, 1942 |

FOREIGN PATENTS

| Number | Country | Date |
|---|---|---|
| 420,673 | Great Britain | 1934 |
| 438,171 | France | 1912 |
| 471,434 | France | 1914 |
| 677,441 | France | 1929 |